UNITED STATES PATENT OFFICE.

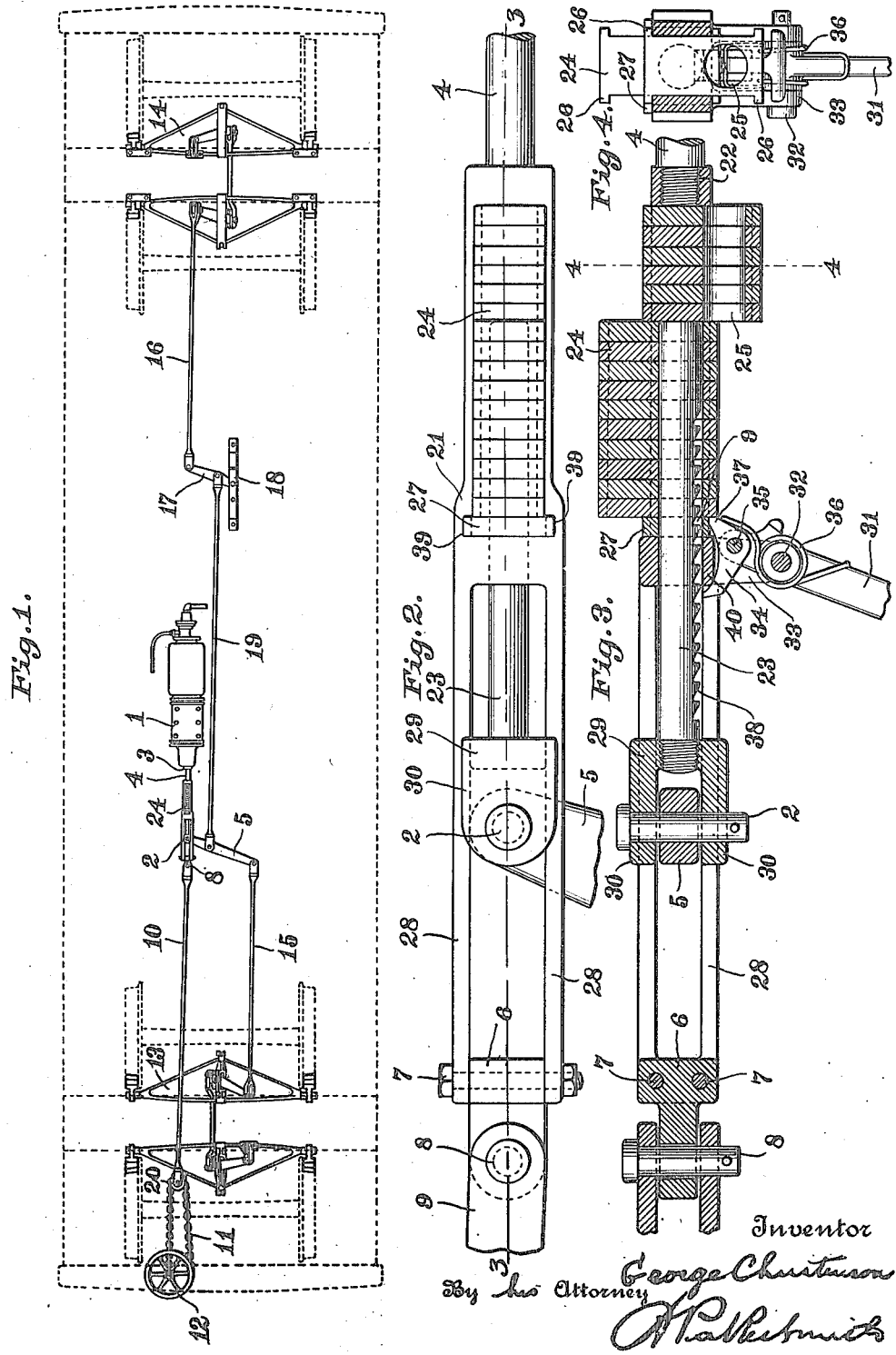
G. CHRISTENSON.
SLACK TAKE-UP FOR FLUID PRESSURE BRAKE SYSTEMS.
APPLICATION FILED AUG. 2, 1915.
1,184,681.
Patented May 23, 1916.

GEORGE CHRISTENSON, OF JAMAICA, NEW YORK, ASSIGNOR TO H. W. JOHNS-MANVILLE COMPANY, A CORPORATION OF NEW YORK.

SLACK TAKE-UP FOR FLUID-PRESSURE BRAKE SYSTEMS.

1,184,681.     Specification of Letters Patent.     Patented May 23, 1916.

Application filed August 2, 1915. Serial No. 43,316.

*To all whom it may concern:*

Be it known that I, GEORGE CHRISTENSON, a citizen of the United States of America, residing at Jamaica, county of Queens, State of New York, have invented certain new and useful Improvements in Slack Take-Ups for Fluid-Pressure Brake Systems, of which the following is a specification.

My invention relates to fluid pressure brake systems and consists of an improvement upon the invention disclosed in my application Serial No. 1,399 filed January 9, 1915, in that it is more particularly designed for use on cars where the hand operated brake mechanism is connected to the loose push rod usually employed in the standard freight car brake rigging.

In the particular form of mechanism shown and described in my said pending application, it is evident that if the hand operated connections are applied to the floating lever of the main brake rigging at the point of said lever's attachment to the power operated members the operation of the take-up mechanism will disarrange the adjustment of the hand brake connections, so that it might follow that the brakes could not be effectively applied by said hand operated connections. My present invention involves a rearrangement of the parts which avoids this difficulty and causes the take-up device to operate equally well upon both the hand and power operated connections, and presents certain other features hereinafter claimed.

The best form of apparatus at present known to me embodying my invention is illustrated in the accompanying sheet of drawings, in which, Figure 1 is a plan view of the entire brake rigging, the car body and trucks being indicated in dotted lines. Fig. 2 is a detail plan view of the take-up device proper with connecting parts broken away. Fig. 3 is a vertical central section on line 3—3 of Fig. 2, and Fig. 4 is a vertical cross section on line 4—4 of Fig. 3, looking in the direction of the arrow.

Throughout the drawings like reference characters indicate like parts.

1, is the usual air brake cylinder having piston (not shown) with hollow piston rod 3, in which is loosely mounted the push rod 4, which by suitable intermediate connections hereinafter to be described, is pivoted to the floating lever 5, of the main brake rigging. The push rod 4, has an extension in line therewith consisting of the rectangular frame 21, with projecting elongated ears 28, 28, forming cross head guides for the cross head block or sliding member 29, which has ears 30, 30, pivoted to the floating lever 5, by pin 2. Said frame 21, is connected to the end of the push rod 4, in any convenient manner, as by the screw joint 22, and the outer ends of the ears 28, 28, are clamped to the toggle block 6, by bolts 7, 7. This toggle block 6, affords means for connecting the push rod to the hand operated connections comprising tension rod 10, pivoted to block 6, by pin 8, and carrying the usual pulley 20, at its outer end, which pulley coöperates with the chain 11, winding up on the shaft of the hand wheel 12.

The standard brake rigging is represented by the truck rigging 13 and 14, the tension rods 15 and 16, the multiplying lever 17, pivoted to the car body at 18, and tie rod 19, all of standard construction.

The adjustable take-up mechanism comprises the rack rod 38, screwed into the cross head 29, and extending in the line of the axis of the push rod 4, the pawl 34, coöperating with teeth 38, on rack rod 23, and pivoted at 35, on the hand lever 31, which in turn is pivotally mounted by pin 32, in the ears 33, 33, dependent from the rectangular frame 21.

36, is a spring which normally forces the lower end of lever 31, to the left and also tends to hold the pawl 34, in yielding engagement with the rack teeth. Within the rectangular frame 21, are mounted a series of transversely movable shims 24, each of which has a perforation 25, large enough to freely admit the passage of the rack rod 23, and which has lugs 26, 26, upon its upper and lower ends normally preventing the withdrawal of the shim from the rectangular frame.

27, is a keeper for the shims which fits into a wider slot 39, in the rectangular frame which slot is of sufficient size to permit the passage of the lugs 26, on shims 24. This keeper 27, is locked in position by the rack rod 23, passing through a perforation 9, in it of diameter equal to that of the perforations in the shims 24. The pawl 34, has a dog 37, formed at its rear end adapted to press against the lower edge of the outermost shim 24, when the lever 31, is forced by spring 36, into the position shown in Fig. 3.

The operation of the invention is as follows: Oscillation of lever 31, causes the pawl 34, to engage rack teeth 38, and forces rack rod 23, and cross head 29, outward from the push rod 4, by step by step action. As the rack rod moves out, shims 24, drop behind it one by one, forming a solid abutment preventing the return of the rack rod. This movement of rack rod and cross head 29, moves the floating lever 5, outward and takes up any desired amount of slack in the brake rigging. When the operator lets go of lever 31, the spring forces it into the position shown in Fig. 3, and causes dog 37, to bear against the shims 24, with yielding pressure which holds the whole series of shims together and prevents rattling. Whenever the brakeman operates the brakes by hand by twisting the hand wheel 12, the tension is transmitted to the push rod connections in the usual way, pulling the push rod out of the hollow piston, applying force to the floating lever 5, and so applying the brakes.

The operation of the particular pawl mechanism shown is as follows: Normally the lever 31, is held in the position shown in Fig. 3, with the pawl 34, withdrawn from engagement with rack teeth 38. When the lower end of lever 31 is swung to the right pawl 34, is forced to the left, and dog 37, riding under the portion 40, of frame 21, forces the nose of the pawl up into positive engagement with one of rack teeth 38, driving the rack rod 23, outward far enough to allow another shim 24, to drop behind it. When lever is released, spring 36, throws it into the position shown.

It is evident that the adjustment of the take-up device operates equally well upon the power and hand operated devices, as the relative position of the cross head 29, and rectangular frame 21, is not disturbed by operation of either the hand or power devices.

Having described my invention, I claim:

1. In a take-up apparatus for fluid pressure brakes the combination with the usual cylinder, piston and brake rigging, of a push rod adapted to be operated by the piston, a sliding member mounted on said push rod and connected to the brake rigging and means for adjusting said connection longitudinally of the push rod adapted to be operated by hand while the brake rigging is under tension and the brakes are set.

2. In a take-up apparatus for fluid pressure brakes the combination with the usual cylinder, piston and brake rigging, of a push rod adapted to be operated by the piston, a sliding member mounted on said push rod and connected to the brake rigging and means for adjusting said connection longitudinally of the push rod, said sliding member and mounting therefor comprising a push rod extension provided with guides parallel to the axis of the push rod, and a cross head movable in said guides, adapted to be pivoted to the floating lever of the brake rigging.

3. In a take-up apparatus for fluid pressure brakes the combination with the usual cylinder, piston and brake rigging, of a push rod adapted to be operated by the piston, a sliding member mounted on said push rod and connected to the brake rigging and means for adjusting said connection longitudinally of the push rod, said sliding member and mounting therefor comprising a push rod extension provided with guides parallel to the axis of the push rod, and a cross head movable in said guides, adapted to be pivoted to the floating lever of the brake rigging, and said adjusting means comprising a rack rod connected to the cross head and a pawl pivoted on the push rod extension.

4. In a take-up apparatus for fluid pressure brakes the combination with the usual cylinder, piston and brake rigging, of a push rod adapted to be operated by the piston, a sliding member mounted on said push rod and connected to the brake rigging and means for adjusting said connection longitudinally of the push rod, together with a series of shims mounted in said push rod extension provided with perforations large enough to receive the rack rod and movable transversely thereof so that perforations may be placed in line with the rack rod or out of line therewith.

5. In a take-up apparatus for fluid pressure brakes the combination of a push rod having an extension with guides parallel to the push rod axis, a cross head sliding in said guides, a rod mounted on the cross head and extending in the line of motion thereof, and a series of shims mounted and movable in the push rod extension and adapted to serve as abutments for the end of the cross head rod when in one position but not when in other positions.

6. In a take-up apparatus for fluid pressure brakes the combination of a push rod having an extension with guides parallel to the push rod axis, a cross head sliding in said guides, a rod mounted on the cross head and extending in the line of motion thereof, and a series of shims mounted and movable in the push rod extension and adapted to serve as abutments for the end of the cross head rod when in one position but not when in other positions, together with manually operated means for moving said cross head rod away from the shims.

7. In a take-up apparatus for fluid pressure brakes the combination of a push rod having an extension with guides parallel to the push rod axis, a cross head sliding in said guides, a rod mounted on the cross head and extending in the line of motion thereof, and a series of shims mounted and movable in the push rod extension and adapted to serve as abutments for the end of the cross head rod when in one position but not when in other positions, together with manually operated means for moving said cross head rod away from the shims comprising ratchet teeth on the cross head rod, a lever pivoted on the push rod extension, and a pawl carried by said lever.

8. In a take-up apparatus for fluid pressure brakes, the combination of a push rod, a rack rod movable longitudinally of the push rod and connected to the brake rigging, a lever pivoted on a bearing rigid with the push rod, a pawl mounted on the lever coöperating with the rack rod, and means for holding the rack rod in different positions of adjustment with reference to the push rod.

9. In a take-up apparatus for fluid pressure brake systems the combination of a rectangular frame, a series of shims mounted in said frame and movable transversely thereof, a rod mounted in said frame so as to slide longitudinally thereof and bear against those shims which are in certain positions of transverse adjustment, and means for applying pressure to the shims when not being moved whereby said shims are prevented from rattling.

10. In a take-up apparatus for fluid pressure brake systems the combination of a rectangular frame, a series of shims mounted in said frame and movable transversely thereof, a rod mounted in said frame so as to slide longitudinally thereof and bear against those shims which are in certain positions of transverse adjustment, and means for applying pressure to the shims when not being moved whereby said shims are prevented from rattling, said means comprising a pawl adapted to move the rod, and a spring forcing the pawl against the shims when the pawl is at rest.

11. In a combined hand brake and fluid pressure brake system having the usual hollow piston and push rod loosely mounted therein, the combination therewith of a rigid projection from the push rod having means for connecting it to the hand brake operating apparatus, and an adjustable connection from the push rod to the main brake rigging.

12. In a combined hand brake and fluid pressure brake system having the usual hollow piston and push rod loosely mounted therein, the combination therewith of a rigid projection from the push rod hav- means for connecting it to the hand brake operating apparatus, and an adjustable connection from the push rod to the main brake rigging, together with manually operated means for adjusting said connection last mentioned.

13. In a combined hand brake and fluid pressure brake system having the usual hollow piston and push rod loosely mounted therein, the combination therewith of a rigid projection from the push rod having means for connecting it to the hand brake operating apparatus, and an adjustable connection from the push rod to the main brake rigging, together with manually operated means for adjusting said connection comprising guides on the push rod, a cross head mounted in said guides and adapted to be pivoted to the floating lever of the main brake rigging, a rack rod connected to the cross head, and a pawl and lever mounted on the push rod.

14. In a combined hand brake and fluid pressure brake system the combination with the cylinder, piston, push rod loosely mounted in the piston, main brake rigging, hand wheel and coöperating tension rod, of an extension for said push rod to which said hand operated tension rod is connected, a member pivoted to the floating lever of the main brake rigging and sliding on said push rod extension, and means for adjusting the position of the sliding member on the push rod extension and temporarily locking it in various positions of adjustment.

GEORGE CHRISTENSON.

Witnesses:
 A. Parker-Smith,
 M. G. Crawford.